United States Patent
Kazmierski et al.

(10) Patent No.: US 9,529,563 B2
(45) Date of Patent: Dec. 27, 2016

(54) MASKING MECHANICAL SEPARATIONS BETWEEN TILED DISPLAY PANELS

(71) Applicant: Google Inc., Mountain View, CA (US)

(72) Inventors: Andrei Kazmierski, Pleasanton, CA (US); Nicholas C. Loomis, Oakland, CA (US); Stephen D. Dorow, San Francisco, CA (US); Adam E. Norton, Palo Alto, CA (US); Mary Lou Jepsen, Sausalito, CA (US); Carlin Vieri, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 23 days.

(21) Appl. No.: 14/584,233

(22) Filed: Dec. 29, 2014

(65) Prior Publication Data

US 2016/0093244 A1    Mar. 31, 2016

Related U.S. Application Data

(60) Provisional application No. 62/057,722, filed on Sep. 30, 2014.

(51) Int. Cl.
*G09G 5/00* (2006.01)
*G06F 3/14* (2006.01)
(Continued)

(52) U.S. Cl.
CPC ......... *G06F 3/1446* (2013.01); *G02F 1/13336* (2013.01); *G09G 3/3648* (2013.01);
(Continued)

(58) Field of Classification Search
CPC .... G06F 3/1423; G06F 3/1446; G09G 3/2092; G09G 2300/023; G09G 2300/026; G09G 2310/0232; G09G 2320/0233; G09G 2320/0686; G02F 1/13336; H05K 5/0021; Y10S 45/903; Y10S 345/903
See application file for complete search history.

(56) References Cited

U.S. PATENT DOCUMENTS 5,661,531 A * 8/1997 Greene ............. G02F 1/133512
                                                        349/73
5,867,236 A * 2/1999 Babuka ................. G09F 9/3026
                                                        349/153
(Continued)

FOREIGN PATENT DOCUMENTS

TW   200410422 A   6/2004
TW   I286241 B     9/2007
(Continued)

OTHER PUBLICATIONS

PCT/US2015/046604—International Search Report and Written Opinion, mailed Feb. 19, 2016, 11 pages.
TW 104132276—First Office Action, mailed Jul. 13, 2016, 9 pages.

*Primary Examiner* — Joe H Cheng
(74) *Attorney, Agent, or Firm* — Blakely Sokoloff Taylor & Zafman LLP

(57) ABSTRACT

A tileable display panel includes an array of display pixels including central display pixels near a center of the array having a center pixel pitch and perimeter display pixels along a perimeter of the array. A perimeter region surrounds the array. The perimeter region includes a first side that is joinable to a second side of another instance of the tileable display panel to form a multi-panel display. The perimeter region has a width that is greater than at least half the center pixel pitch such that a gap between adjacent perimeter display pixels of the tileable display panel and the other instance of the tileable display panel when forming the multi-panel display is greater than the center pixel pitch. The gap is visually masked by increasing a characteristic of the (Continued)

perimeter display pixels adjacent to the gap relative to the same characteristic of the central display pixels.

18 Claims, 5 Drawing Sheets

(51) Int. Cl.
    *G02F 1/1333*          (2006.01)
    *G09G 3/36*            (2006.01)

(52) U.S. Cl.
    CPC ............... *G09G 2300/026* (2013.01); *G09G 2310/0232* (2013.01); *G09G 2320/0686* (2013.01)

(56) References Cited

U.S. PATENT DOCUMENTS

| | | | |
|---|---|---|---|
| 6,097,455 A * | 8/2000 | Babuka | G02F 1/13336 349/158 |
| 6,188,454 B1 | 2/2001 | Greene et al. | |
| 6,611,241 B1 * | 8/2003 | Firester | H04N 9/12 345/1.1 |
| 6,624,870 B1 * | 9/2003 | Greene | G02F 1/13336 349/153 |
| 6,927,908 B2 * | 8/2005 | Stark | G02F 1/13336 345/1.3 |
| 6,980,272 B1 * | 12/2005 | Matthies | G02F 1/13439 349/139 |
| 7,019,713 B2 * | 3/2006 | Hereld | H04N 9/12 345/1.1 |
| 7,256,550 B2 | 8/2007 | Park et al. | |
| 7,777,691 B1 | 8/2010 | Nimmer et al. | |
| 8,390,532 B2 | 3/2013 | Hanamura et al. | |
| 8,482,480 B2 * | 7/2013 | Kim | G06F 3/1446 345/1.1 |
| 9,146,400 B1 * | 9/2015 | Lee | G02B 3/0037 |
| 2002/0050958 A1 * | 5/2002 | Matthies | H01L 25/167 345/55 |
| 2002/0080302 A1 * | 6/2002 | Dubin | G02F 1/13336 349/73 |
| 2004/0051944 A1 | 3/2004 | Stark | |
| 2004/0114084 A1 | 6/2004 | Kim et al. | |
| 2006/0012733 A1 | 1/2006 | Jin et al. | |
| 2006/0061861 A1 * | 3/2006 | Munro | G03B 21/625 359/456 |
| 2010/0123384 A1 * | 5/2010 | Miller | H01L 27/3293 313/498 |
| 2010/0177261 A1 | 7/2010 | Jin et al. | |
| 2010/0259566 A1 * | 10/2010 | Watanabe | G02B 3/08 345/690 |
| 2011/0057861 A1 * | 3/2011 | Cok | H01L 27/3293 345/1.3 |
| 2011/0215990 A1 * | 9/2011 | Liesenberg | G09G 5/00 345/1.3 |
| 2013/0093646 A1 | 4/2013 | Curtis et al. | |
| 2013/0135589 A1 | 5/2013 | Curtis et al. | |
| 2013/0278872 A1 * | 10/2013 | Teller | G02B 3/0037 349/96 |
| 2014/0126075 A1 * | 5/2014 | Comstock, II | G02B 5/045 359/831 |
| 2015/0023051 A1 * | 1/2015 | Jepsen | G09G 3/20 362/559 |
| 2015/0097837 A1 * | 4/2015 | Jepsen | G06F 3/1446 345/428 |
| 2015/0138755 A1 * | 5/2015 | Bastani | G09F 13/04 362/97.1 |

FOREIGN PATENT DOCUMENTS

| | | |
|---|---|---|
| TW | 201117376 A | 5/2011 |
| WO | WO 2008/022464 A1 | 2/2008 |

\* cited by examiner

MASKING MECHANICAL SEPARATIONS BETWEEN TILED DISPLAY PANELS

CROSS-REFERENCE TO RELATED APPLICATIONS

This application claims the benefit of U.S. Provisional Application No. 62/057,722 filed on Sep. 30, 2014, the contents of which are incorporated herein by reference.

TECHNICAL FIELD

This disclosure relates generally to display panels, and in particular but not exclusively, relates to seamless tiling of display panels.

BACKGROUND INFORMATION

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system and method for seamless tileable display panels that visually mask inter-panel gaps are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
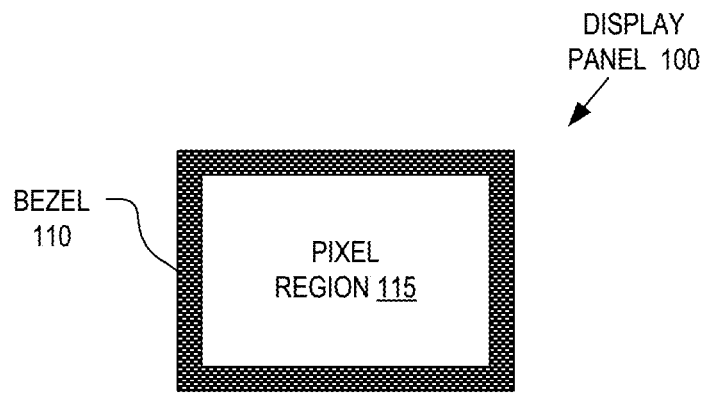
FIGS. 1A & 1B (PRIOR ART) illustrate conventional display panel tiling.
Figure 1B:
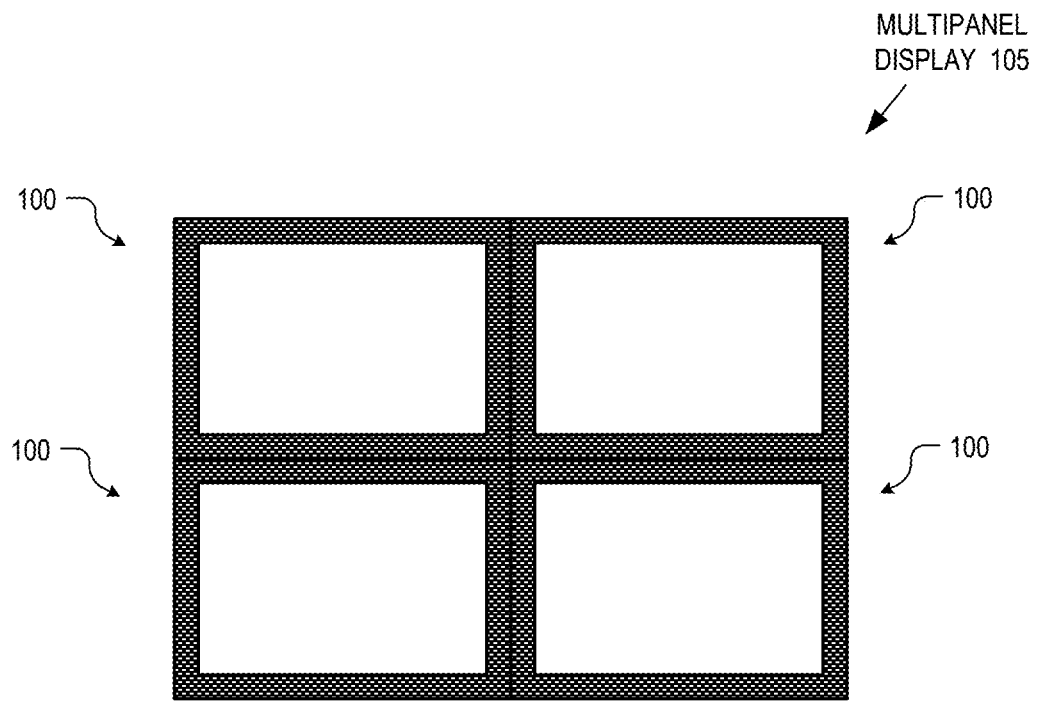
Figure 2:
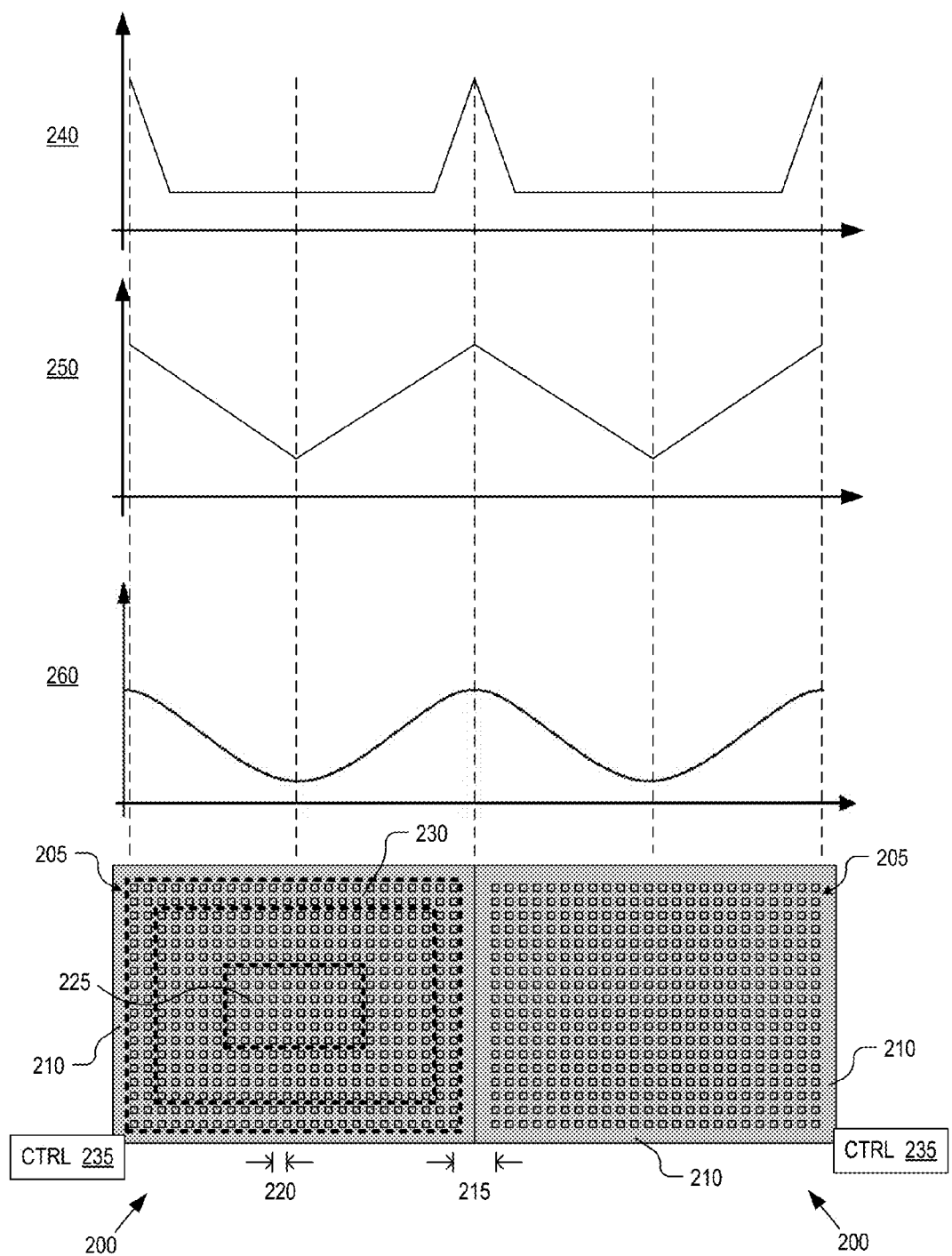
FIG. 2 illustrates how a characteristic may be varied over an array of display pixels to visually mask a gap between adjacent tileable display panels, in accordance with embodiments of the disclosure.

FIG. 2 illustrates how a characteristic may be varied over an array of display pixels to visually mask a gap between adjacent tileable display panels 200, in accordance with embodiments of the disclosure. The illustrated embodiment of tileable display panels 200 each include an array of display pixels 205 surrounded by a perimeter region 210 that results in a gap 215 between adjacent tileable display panels 200.

Perimeter region 210 may include the bezel or housing surrounding tileable display panels 200. Perimeter region 210 often includes space for peripheral electronics such as edge mounted back lights in the case of liquid crystal displays ("LCDs"). As such, gaps 215 formed by abutted perimeter regions 210 is typically larger than the center pixel pitch 220 of central display pixels 225 located near a center of array 205. In other words, the width of perimeter region 210 is greater than half the center pixel pitch 220 to accommodate electronics, signal paths, and/or mechanical bezels. The larger spacing that results from gap 215 can cause a noticeable and visually deleterious seam between tileable display panels 200. The visual apparentness of this seam is due to the abrupt change in the inter-panel pixel pitch and the relative darkness of gap 215, since no display light is emitted from gap 215.

Accordingly, embodiments of tileable display panels 200 vary a characteristic across the array of display pixels 205 to visually mask gaps 215 and provide the illusion of a seamless multi-panel display. In various embodiments, the characteristic is a display characteristic of the display pixels that is increased for perimeter display pixels 230 relative to central display pixels 225. Although FIG. 2 illustrates perimeter display pixels 230 as including a band of two display pixels wide surrounding the perimeter of tileable display panels 200, it should be appreciated that perimeter display pixels 230 may be only a single pixel wide or greater than two pixels wide. Similarly, FIG. 2 illustrates central display pixels 225 as including a six by ten array of display pixels as a mere example, but it should be appreciated that central display pixels 225 may include a larger or smaller grouping of display pixels disposed about the central region of arrays 205.

Examples of the characteristics that may be varied across arrays 205 include pixel pitch, pixel brightness bias, or combinations thereof. In one embodiment, by increasing the pixel pitch with increasing distance from the center of tileable display panel 200, the inter-panel pixel pitch can approach or equal gap 215, thereby visually masking the seam between adjacent tileable display panels 200. In one embodiment, the brightness bias of the display pixels may be increased adjacent to an inter-panel seam. By increasing the brightness bias of these perimeter display pixels, the darkness of gaps 215 is offset, thereby by visually masking the inter-panel seam at gap 215. As discussed below, the brightness bias may be varied using a variety of different techniques including varying the emission apertures of the display pixels themselves, varying a transparency/reflectivity of the display pixels themselves, varying a bias drive signal, or otherwise. A hybrid embodiment that combines increasing pixel pitch and increasing brightness bias may also be implemented.

The variability of the characteristic may be an immutable design structure of tileable display panels 200, such as varying pixel pitch or varying emission aperture size of the display pixels. Correspondingly, the characteristic may be a feature that is capable of being enabled or disabled under the influence of a controller with logic disposed within tileable display panels 200. For example, controller 235 may be included within each tileable display 200. In one embodiment, controllers 235 operate to vary the characteristic across arrays 205 based upon a determination of which sides of the arrays 205 abuts another instance of the tileable display panel 200. If a given side is determined to be coupled to an adjacent tileable display panel 200, then the characteristic (e.g., brightness bias) may be increased for just those perimeter display pixels 230 adjacent to another instance of tileable display panel 200. This determination may be implemented using sensor pads or communication ports disposed along each of the sides of a tileable display panel 200 that are capable of sensing an adjacent tileable display panel 200. Accordingly, in various embodiments, the characteristic may be increased for perimeter display pixels 230 falling along one, two, three, or four sides of a given array 205 relative to center display pixels 225.

FIG. 2 includes charts 240, 250, and 260 that illustrate three examples of how the characteristic may be varied across arrays 205 to visually mask gap 215. Chart 240 illustrates an example where the characteristic is constant across central display pixels 225 and increases proximate to perimeter display pixels 230. Chart 250 illustrates an example where the characteristic increases linearly from the center of array 205 out to its perimeter. Chart 260 illustrates an example where the characteristic increases non-linearly from the center of array 205 out to its perimeter. Although FIG. 2 only illustrates the variability in the characteristic occurring horizontally across arrays 205, it should be appreciated that the variability may also occur vertically across arrays 205 or only occur from the center of array 205 towards a given side that abuts another instance of tileable display panel 200. Other variability functions may be implemented.

Figure 3:
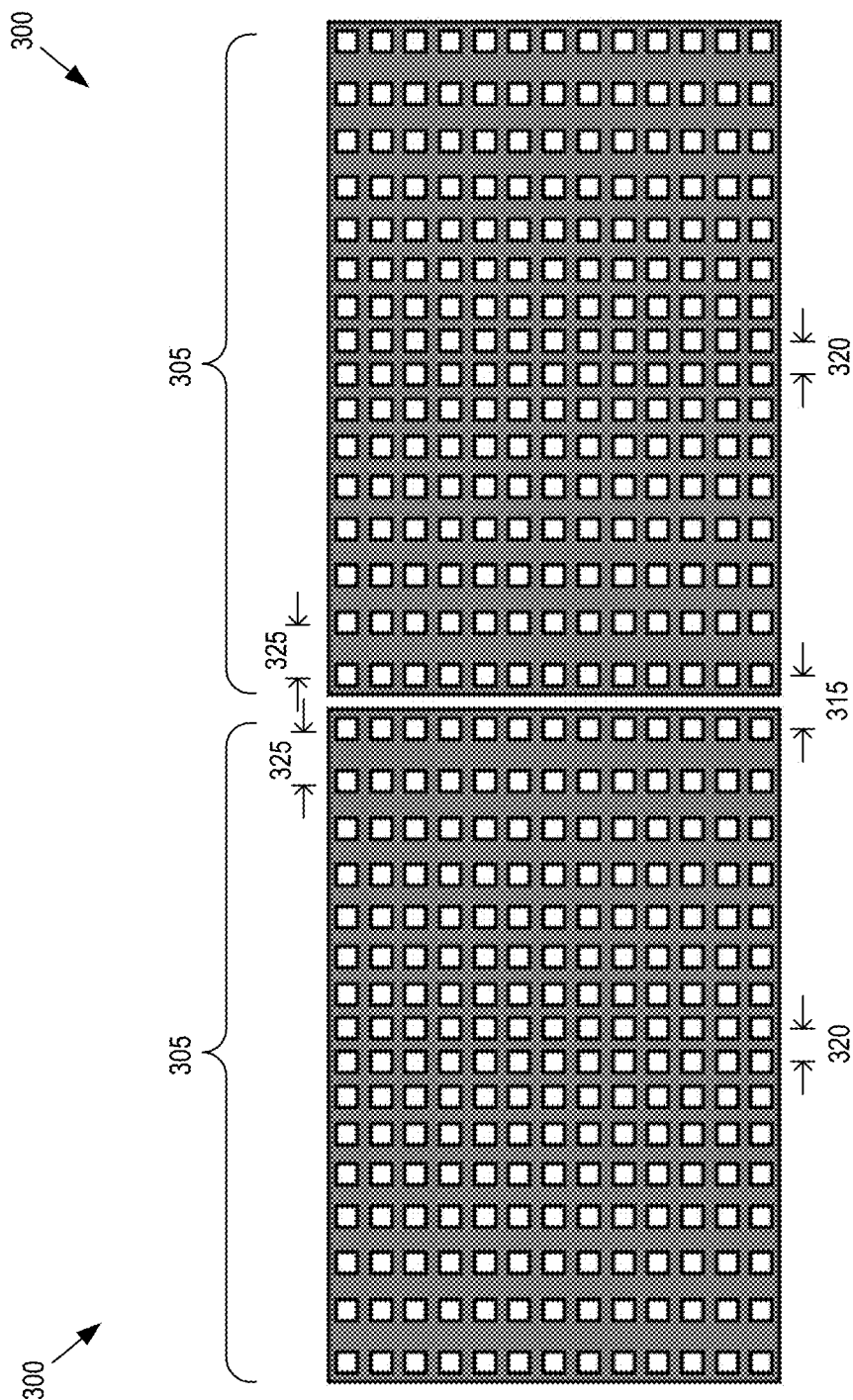
FIG. 3 illustrates adjacent tileable display panels having pixel arrays with a variable pitch to mask an inter-panel gap, in accordance with an embodiment of the disclosure.

FIG. 3 illustrates adjacent tileable display panels 300 having arrays of display pixels 305 with a variable pitch to mask an inter-panel gap 315, in accordance with an embodiment of the disclosure. As mentioned above, pixel pitch is one possible characteristic that can be varied across an array of display pixels to visually mask inter-panel gap 315 and provide a seamless multi-panel display.

As illustrated in FIG. 3, the pixel pitch increases with distance from the center of each tileable display panel 300 such that a perimeter pixel pitch 325 is greater than a center pixel pitch 320. In one embodiment, the perimeter pixel pitch 325 may increase until it is substantially equal to inter-panel gap 315, which is measured as the inter-panel pixel pitch. Increasing the pixel pitch towards the perimeter display pixels operates to visually mask the inter-panel seam, since the pitch between adjacent inter-panel perimeter pixels does not have an abrupt change at the inter-panel seam. In other embodiments, perimeter pixel pitch 325 is increased relative to center pixel pitch 320, but is still less than inter-panel gap 315. This later embodiment still reduces the apparentness of the seam while retaining higher resolution around the perimeter region of tileable display panels 300. As mentioned above in connection with charts 240, 250, and 260, the pitch variability function need not be a linear increase from center to perimeter as illustrated, but may be implemented using a number of different functions. Although FIG. 3 illustrates a pixel pitch variability in just the horizontal dimension, it should be appreciated that this variability may also be extended to the vertical dimension, or in any direction to which an adjacent tileable display panel is abutted.

Figure 4A:
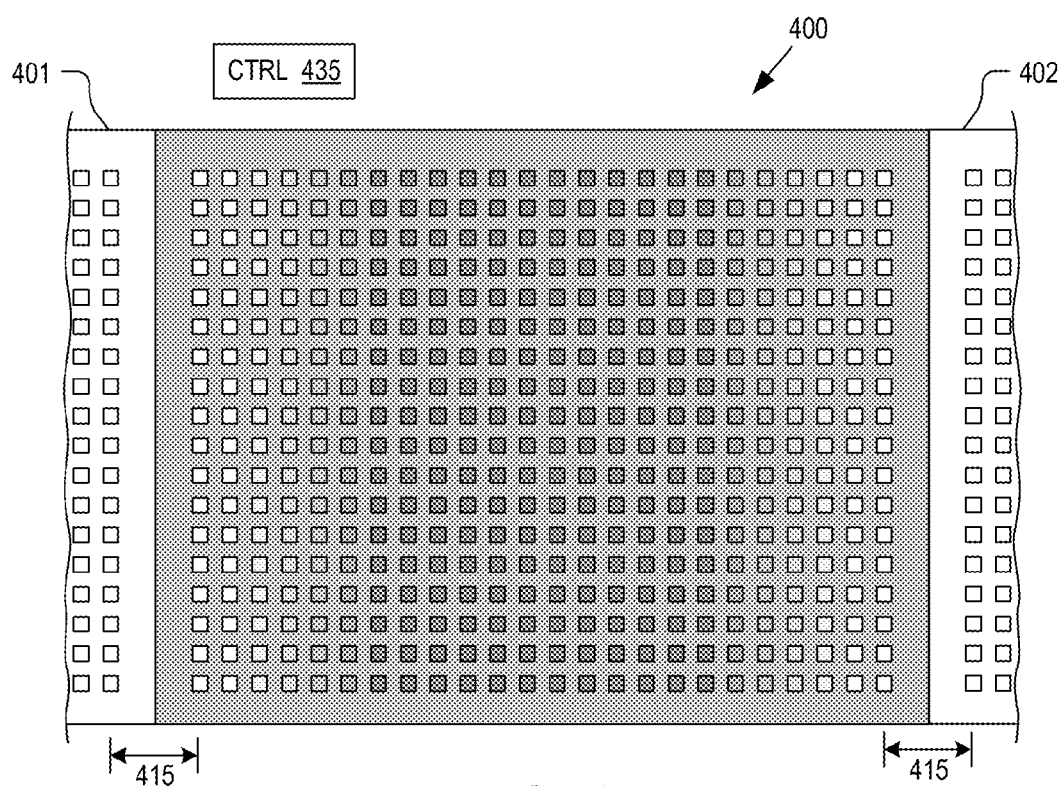
FIGS. 4A & 4B illustrate how a brightness bias of display pixels within tileable display panels can be varied to mask an inter-panel gap, in accordance with an embodiment of the disclosure.

FIG. 4A illustrates how increasing the brightness bias of perimeter display pixels relative to central display pixels visually masks inter-panel gap 415, in accordance with an embodiment of the disclosure. The pixel brightness bias illustrated in FIG. 4A is adjustable and may be manipulated via a variety of techniques. For example, for active emission display technologies (e.g., organic light emitting diode displays, plasma displays, etc.) a biasing drive signal may be increased such that perimeter display pixels emit display light at a brighter bias setting than the central display pixels. In an example of backlit display technologies (e.g., liquid crystal displays) a biasing drive signal may be increased such that the transparency of the perimeter display pixels is increased to emit display light at a brighter bias setting than the central display pixels. In an example of front illumination display technologies (e.g., liquid crystal on silicon displays) the biasing drive signal may be increased such that the reflectivity of the perimeter display pixels is increased to emit display light at a brighter bias setting than the central display pixels. The brighter perimeter display pixels located along inter-panel gap 415 offset the lack of light emanating from inter-panel gap 415 to overcome the dark line and visually mask inter-panel gap 415.

The technique illustrated in FIG. 4A uses display pixels having common sized emission apertures across tileable display panel 400. In one embodiment, the brightness bias of the display pixels is manipulated under the influence of controller 435. As such, the brightness bias of individual perimeter display pixels may be manipulated depending upon whether another tileable display panel 401 or 402 is currently abutted to a given side of tileable display panel 400. When a given side of tileable display panel 400 does not abut another instance of the tileable display panel, then the brightness bias of those adjoining perimeter display pixels is biased similar to the central display pixels (as illustrated). Although FIG. 4A illustrates a brightness bias variability in just the horizontal dimension, it should be appreciated that this variability may also be extended to the vertical dimension, or in any direction to which an adjacent tileable display panel is abutted.

Figure 4B:
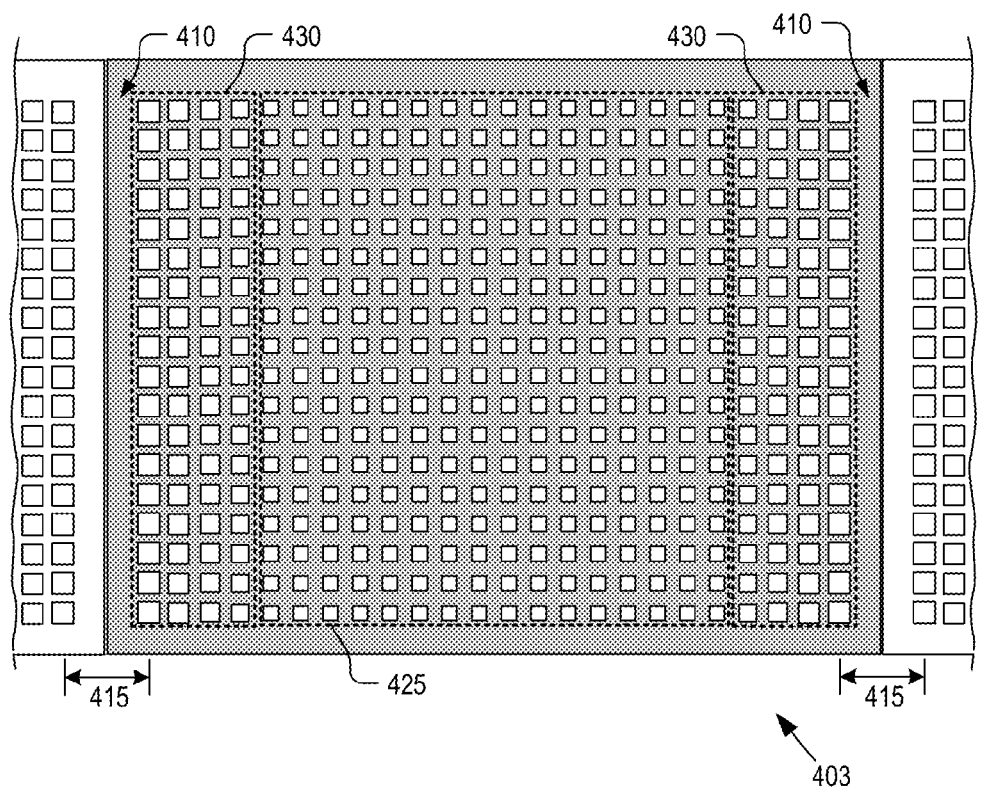

FIG. 4B illustrates a tileable display panel 403 that increases a size of an emission aperture of the perimeter display pixels 430 relative to the central display pixels 425 to achieve an increased brightness bias towards the perimeter of the tileable display panel. Tileable display panel 403 may be implemented with backlit or front illumination display technologies. By increasing the emission aperture of the perimeter display pixels, these display pixels transmit or reflect more display light, thus offsetting the dark line caused by inter-panel gap 415. Although FIG. 4B only illustrates increased emission apertures on the left and right sides of tileable display panel 403, in embodiments where tileable display panel 403 may be tiled horizontally and vertically, the emission aperture of the display pixels near the perimeter top and perimeter bottom of tileable display panel 403 may also increase in size in a similar manner.

Figure 5A:
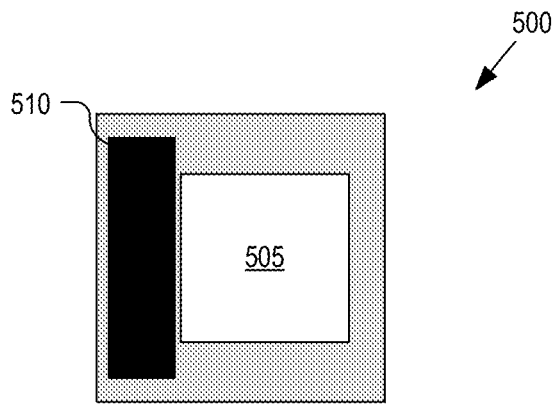
FIGS. 5A-C illustrate various display pixel architectures for increasing a size of an emission aperture to increase a brightness bias, in accordance with an embodiment of the disclosure.
Figure 5B:
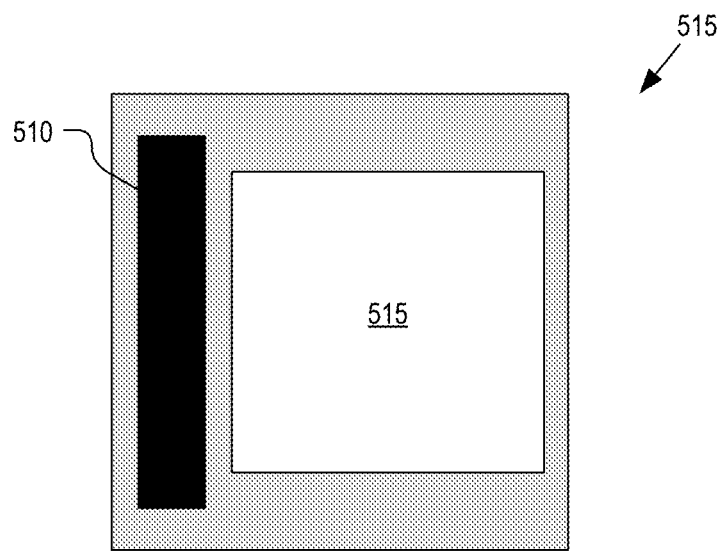
Figure 5C:
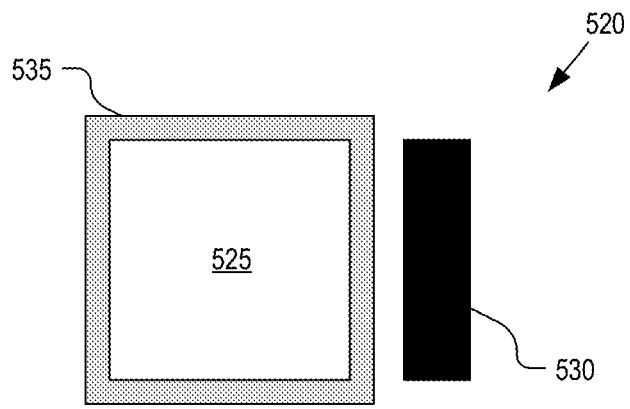

FIGS. 5B and 5C illustrate various perimeter display pixel architectures for increasing a size of an emission aperture to increase a brightness bias, in accordance with an embodiment of the disclosure. FIG. 5A illustrates a central display pixel 500, which represents one of the central display pixels 425 of tileable display panel 403 illustrated in FIG. 4B. The illustrated embodiment of central display pixel 500 includes an emission aperture 505 and pixel circuitry 510. The pixel circuitry 510 is addressable and activated to control the transparency of emission aperture 505, as is known for LCD display technology. The size of emission aperture 505 is related to the resolution and brightness of central display pixels 425.

FIG. 5B illustrates a perimeter display pixel 515, according to an embodiment of the disclosure. Perimeter display pixel 515 represents one possible implementation of perimeter display pixels 430 illustrated in FIG. 4B. Perimeter display pixel 515 has an increased size for emission aperture 515 relative to emission aperture 505 of central display pixel 500. The greater sized emission aperture 515 provides an increased brightness bias, relative to emission aperture 505, by inherently transmitting or reflecting more display light.

FIG. 5C illustrates a perimeter display pixel 520, according to another embodiment of the disclosure. Perimeter display pixel 520 also represents one possible implementation of perimeter display pixels 430 illustrated in FIG. 4B. The illustrated embodiment of perimeter display pixel 520 includes an emission aperture 525 and pixel circuitry 530 that has been moved external to the array of display pixels. By moving the pixel circuitry 530 to an external location, emission aperture 525 can be increased in size to occupy a greater portion of the pixel cell 535 thereby providing an inherent increase in brightness bias relative to central display pixels 500.

In one embodiment, the pixel circuitry 530 for controlling the transparency or reflectivity of emission aperture 525 is moved into peripheral region 410 of tileable display panel 403. Accordingly, in one embodiment, peripheral display pixels 430 move their pixel circuitry out of their respective pixel cells into peripheral region 410, while central display pixels 425 retain their pixel circuitry inside their respective pixel cells within the array of display pixels. Although FIG. 4B illustrates that the peripheral display pixels 430 include four columns of display pixels, in other embodiments, there may be fewer columns (and rows for two dimensional display tiling), such as two or three columns. In yet other embodiments, peripheral display pixels 430 may include greater than four display pixels wide. In one embodiment, only the very outer peripheral display pixels 430 export their pixel circuitry into the adjacent peripheral region 410 to further increase the size of their emission aperture.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A tileable display panel, comprising:
    an array of display pixels to output a screen image, the array of display pixels including central display pixels near a center of the array of display pixels having a center pixel pitch and perimeter display pixels along a perimeter of the array of display pixels; and
    a perimeter region surrounding the array of display pixels, the perimeter region having a first side that is joinable to a second side of another instance of the tileable display panel to form a multi-panel display,
    wherein the perimeter region has a width that is greater than at least half the center pixel pitch such that a gap between adjacent perimeter display pixels of the tileable display panel and the other instance of the tileable display panel when forming the multi-panel display is greater than the center pixel pitch,
    wherein the gap is visually masked by increasing characteristics of the perimeter display pixels adjacent to the gap relative to the same characteristics of the central display pixels, wherein a first characteristic is a pixel pitch of the display pixels such that a perimeter pixel pitch of the perimeter display pixels is greater than the center pixel pitch, wherein a second characteristic is a brightness bias of the display pixels such that the perimeter display pixels along the gap have an increased brightness bias relative to the central display pixels to offset a darkness of the gap.

2. The tileable display panel of claim 1, wherein the characteristics increase according to a non-linear function with distance from a center of the array of display pixels.

3. The tileable display panel of claim 2, wherein the characteristics are constant across a center portion of the array of display pixels and increase proximate to the perimeter display pixels.

4. The tileable display panel of claim 1, further comprising:
    a controller coupled to determine whether a given side of the array of display pixels abuts another instance of the tileable display panel and coupled to increase the brightness bias of the perimeter display pixels determined to be adjacent to another instance of the tileable display panel.

5. The tileable display panel of claim 1, wherein the brightness bias of the display pixels is increased by increasing a size of an emission aperture of the perimeter display pixels relative to the central display pixels.

6. The tileable display panel of claim 5, further comprising:
    pixel circuitry coupled to the perimeter display pixels to control a transparency of the perimeter display pixels, wherein the pixel circuitry is disposed external to the perimeter display pixels in the perimeter region.

7. The tileable display panel of claim 1, wherein the central display pixels and the perimeter display pixels have commonly sized emission apertures and wherein the brightness bias of the display pixels is increased by biasing drive signals of the perimeter display pixels differently relative to the central display pixels.

8. The tileable display panel of claim 1, wherein the perimeter pixel pitch of the perimeter display pixels is approximately equal to the gap between adjacent perimeter display pixels of the tileable display panel and the other instance of the tileable display panel when forming the multi-panel display.

9. The tileable display panel of claim 1, wherein the perimeter pixel pitch of the perimeter display pixels is greater than the center pixel pitch but less than the gap between the adjacent perimeter display pixels of the tileable display panel and the other instance of the tileable display panel when forming the multi-panel display.

10. A tileable display panel, comprising:
an array of display pixels to output a screen image, the array of display pixels including central display pixels near a center of the array of display pixels having a center pixel pitch and perimeter display pixels along a perimeter of the array of display pixels; and
a perimeter region surrounding the array of display pixels, the perimeter region having a first side that is joinable to a second side of another instance of the tileable display panel to form a multi-panel display,
wherein the perimeter region has a width that is greater than at least half the center pixel pitch such that a gap between adjacent perimeter display pixels of the tileable display panel and the other instance of the tileable display panel when forming the multi-panel display is greater than the center pixel pitch,
wherein the gap is visually masked by changing a pixel pitch of the display pixels across the array of display pixels such that a perimeter pixel pitch of the perimeter display pixels is greater than the center pixel pitch.

11. The tileable display panel of claim 10, wherein the gap is further visually masked by increasing a brightness bias of the perimeter display pixels adjacent to the gap relative to the brightness bias of the central display pixels to offset a darkness of the gap.

12. The tileable display panel of claim 11, further comprising:
a controller coupled to determine whether a given side of the array of display pixels abuts another instance of the tileable display panel and coupled to increase the brightness bias of the perimeter display pixels determined to be adjacent to another instance of the tileable display panel.

13. The tileable display panel of claim 11, wherein the brightness bias of the perimeter display pixels is increased by increasing a size of an emission aperture of the perimeter display pixels relative to the central display pixels.

14. The tileable display panel of claim 13, further comprising:
pixel circuitry coupled to the perimeter display pixels to control a transparency of the perimeter display pixels,
wherein the pixel circuitry is disposed external to the perimeter display pixels in the perimeter region.

15. The tileable display panel of claim 11, wherein the central display pixels and the perimeter display pixels have commonly sized emission apertures and wherein the brightness bias of the perimeter display pixels is increased by biasing drive signals of the perimeter display pixels differently relative to the central display pixels.

16. The tileable display panel of claim 11, wherein the brightness bias is constant across a center portion of the array of display pixels and increases proximate to the perimeter display pixels.

17. A tileable display panel, comprising:
an array of display pixels to output a screen image, the array of display pixels including central display pixels near a center of the array of display pixels having a center pixel pitch and perimeter display pixels along a perimeter of the array of display pixels; and
a perimeter region surrounding the array of display pixels, the perimeter region having a first side that is joinable to a second side of another instance of the tileable display panel to form a multi-panel display,
wherein the perimeter region has a width that is greater than at least half the center pixel pitch such that a gap between adjacent perimeter display pixels of the tileable display panel and the other instance of the tileable display panel when forming the multi-panel display is greater than the center pixel pitch,
wherein the gap is visually masked by increasing a characteristic of the perimeter display pixels adjacent to the gap relative to the same characteristic of the central display pixels, wherein the characteristic of the display pixels is a pixel pitch of the display pixels such that a perimeter pixel pitch of the perimeter display pixels is greater than the center pixel pitch.

18. The tileable display panel of claim 17, wherein the perimeter pixel pitch of the perimeter display pixels is approximately equal to the gap between adjacent perimeter display pixels of the tileable display panel and the other instance of the tileable display panel when forming the multi-panel display.

* * * * *